(12) United States Patent
Lambert (10) Patent No.: US 10,035,514 B1
(45) Date of Patent: Jul. 31, 2018

(54) DYNAMIC CONFIGURATION OF EVENT RECORDER CONTENT CAPTURE

(71) Applicant: Lytx, Inc., San Diego, CA (US)

(72) Inventor: Daniel Lambert, Carlsbad, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/550,732

(22) Filed: Nov. 21, 2014

(51) Int. Cl.
  *B60K 28/02* (2006.01)
  *B60W 40/09* (2012.01)
  *B60W 40/08* (2012.01)

(52) U.S. Cl.
  CPC ..... *B60W 40/09* (2013.01); *B60W 2040/0818* (2013.01); *B60W 2040/0836* (2013.01)

(58) Field of Classification Search
  CPC .......... B60K 28/06; B60R 1/00; G06Q 10/06; B60Q 1/00
  See application file for complete search history.

(56) References Cited

U.S. PATENT DOCUMENTS

| 2008/0294690 A1* | 11/2008 | McClellan | G01S 5/0027 |
| 2011/0169625 A1* | 7/2011 | James | B60Q 9/008 340/439 |
| 2014/0172467 A1* | 6/2014 | He | B60K 28/066 705/4 |

OTHER PUBLICATIONS

Lambert et al. U.S. Appl. No. 13/951,719, filed Jul. 7, 2013.
Caridakis et al. Multimodal Emotion Recognition from Expressive Faces, Body Gestures and Speech. International Federation for Information Processing, vol. 247, Artificial Intelligence and Innovations 2007: From Theory to Applications, eds. Boukis et al. (Boston: Springer), pp. 375-388.

* cited by examiner

*Primary Examiner* — Ryan Rink
*Assistant Examiner* — Paul A Castro
(74) *Attorney, Agent, or Firm* — Van Pelt, Yi & James LLP (57) ABSTRACT

A system for capturing video comprises an input interface and a processor. The input interface is configured to receive sensor data. The processor is configured to determine whether a driver is in a dangerous state based at least in part on the sensor data; and in the event the driver is in the dangerous state, provide an indication to turn on interior video capture.

21 Claims, 7 Drawing Sheets

DYNAMIC CONFIGURATION OF EVENT RECORDER CONTENT CAPTURE

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Some vehicle event recorder systems include both an outward-facing camera (e.g., to capture images of the road) and an inward-facing camera (e.g., to capture images of the driver). However in some circumstances, images of the driver are not recorded and/or transmitted and the camera is turned off.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic configuration of event recorder content capture is disclosed. A system for capturing video comprises a sensor interface and a dangerous state determiner. The sensor interface is configured to receive sensor data. The dangerous state determiner is configured to determine whether a driver is in a dangerous state based at least in part on the sensor data and, in the event the driver is in the dangerous state, provide an indication to turn on interior video capture.

In some embodiments, a vehicle event recorder mounted on a vehicle records anomalous vehicle events. Anomalous vehicle event types include accidents, speed limit violations, rough road events, hard maneuvering events (e.g., hard cornering, hard braking), dangerous driving events (e.g., cell phone usage, eating while driving, working too long of a shift, sleepy driving, etc.), and any other appropriate kind of anomalous vehicle events. When anomalous vehicle events occur, sensors (video recorders, audio recorders, accelerometers, gyroscopes, vehicle state sensors, GPS, etc.) record anomalous vehicle event data associated with the event. The event is stored on the vehicle event recorder associated with the event data. Events are transmitted to a vehicle data server for review and long-term storage.

In some embodiments, a vehicle event recorder includes both an outward-facing (e.g., road-facing) camera and an inward-facing (e.g., driver-facing camera). The outward-facing camera observes the events on the road, including other cars, traffic lights, pedestrians, etc. The inward-facing camera observes the driver, in order to identify the driver and to observe signs of driver inattentiveness (e.g., yawning, excessive blinking, or other signs of drowsiness; eating; cell phone usage; not checking the mirrors; etc.). In some embodiments, the inward-facing camera provides important data for determining driver safety and is valuable to the driver management. In some cases, a driver and/or organizations of drivers (e.g., unions) may prefer not to be recorded by an inward facing camera for privacy and/or other reasons. In some embodiments, in the event that a driver is recorded but prefers not to be recorded, disabling the camera can be offered as a reward for good driving (e.g., after collecting sufficient good driving tokens/points). A vehicle event recorder system can therefore default to leaving the inward-facing camera off during typical driving. In the event the driver exhibits signs of egregious driving (e.g., drunken driving, road rage, excessive speeding), information from the inward camera can be particularly valuable in determining the driver state. When signs of egregious driving are detected by the vehicle event recorder, the vehicle event recorder identifies the signs and activates the internal camera. In some embodiments, the internal camera is switched from a mode where data is taken internally but not permanently stored (e.g., not stored to non-volatile memory) to where data is permanently stored (e.g., stored to non-volatile memory). In some embodiments, data taken but not permanently stored is processed to identify whether the driver is in a dangerous state.

In some embodiments, the vehicle event recorder is made more efficient in that it is able to determine whether the state of the driver is a dangerous state and to automatically enable the recording and storing of video data of the interior of the vehicle. This is beneficial to a fleet owner or customer using a vehicle event recorder system in that it enables the storage of data that can be used to improve performance. For example, video data can be reviewed for training purposes or a fleet owner or customer can be notified so that a call can be made to the driver of the vehicle or other remote action can be performed to reduce risk to the fleet owner or customer.

Figure 1:
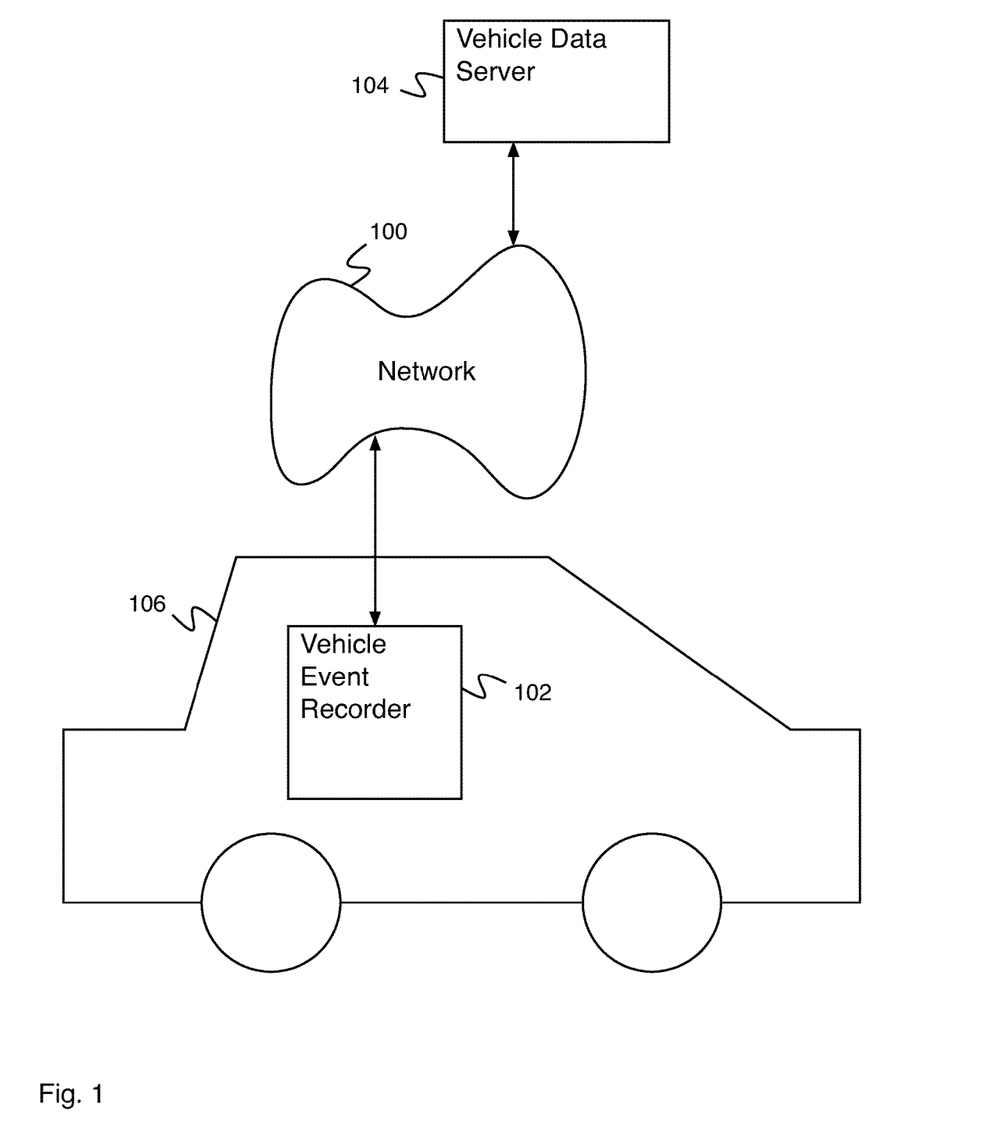
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, cameras, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, a driver identification camera, a door open sensor, an ignition on sensor, a power take-off sensor, a cargo door sensor, a rear activity camera, or any other appropriate vehicle state sensors. In various embodiments, vehicle event recorder 102 interfaces with vehicle sensors via an on-board diagnostics (OBD) bus (e.g., society of automotive engineers (SAE) J1939, J1708/J1587, On-Board Diagnostics (OBD)-II, controller area network (CAN) BUS, etc.), using an interface to a powertrain control module (e.g., a PCM), using FlexRay (e.g., a communication protocol), or using any other appropriate interface or protocol.

In some embodiments, vehicle event recorder 102 comprises a system for processing sensor data and detecting events. In some embodiments, vehicle event recorder 102 comprises a system for determining when a driver is in a dangerous state. In some embodiments, vehicle event recorder 102 comprises a system for capturing interior video. In various embodiments, vehicle event recorder 102 comprises a system for detecting risky behavior, for detecting risky driving, for uploading anomalous driving events, for coaching a driver, or for any other appropriate purpose. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, universal mobile telecommunications system (UMTS), long term evolution (LTE), worldwide interoperability for microwave access (WiMax), integrated digital enhanced network (iDEN), or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, a fleet base, etc.). In some embodiments, events recorded by vehicle event recorder 102 are downloaded to vehicle data server 104 when vehicle 106 arrives at the home station. In some embodiments, vehicle data server 104 is located at a remote location.

Figure 2:
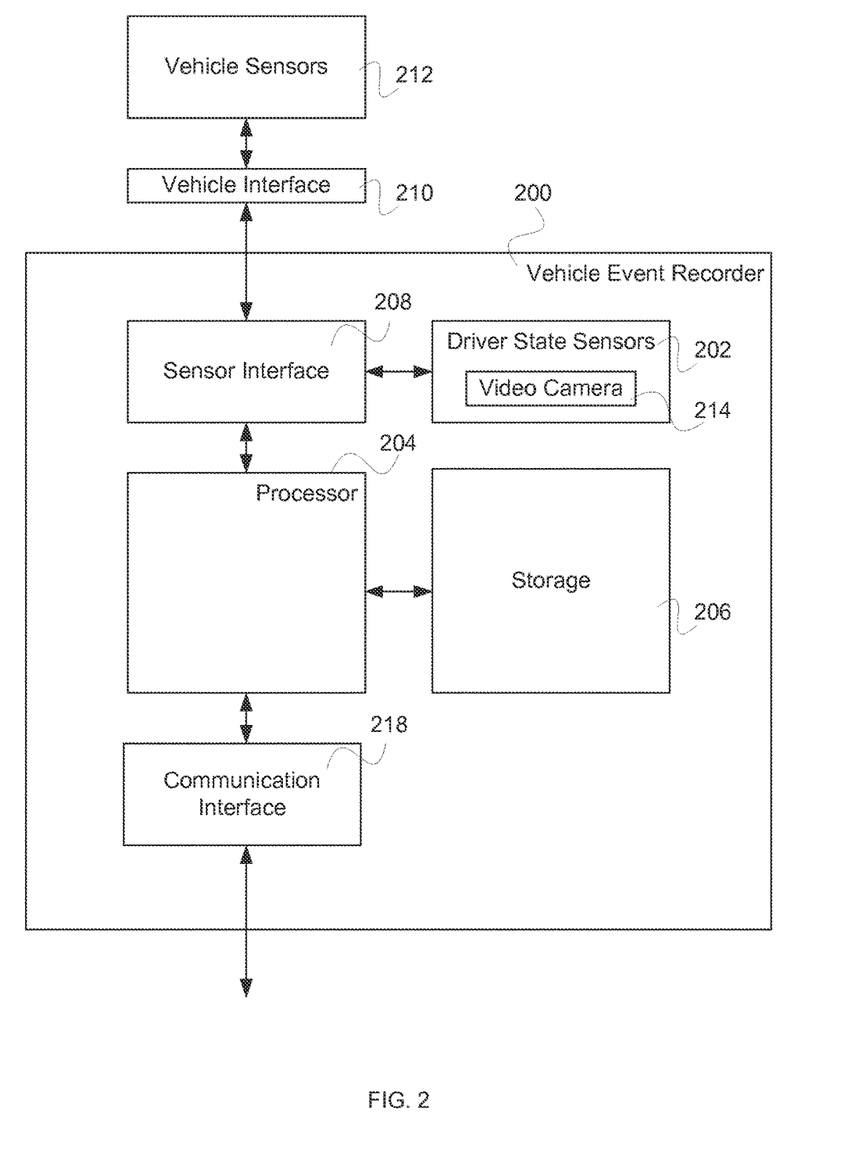
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. In the example shown, vehicle event recorder 200 comprises driver state sensors 202. Driver state sensors 202 comprise sensors for capturing data used to determine a driver state. In some embodiments, driver state sensors 202 comprise event recorder sensors producing data that can be used to determine information describing a driver state. In various embodiments, event recorder sensors comprise audio sensors, video sensors (e.g., video camera 214), accelerometers, gyroscopes, vehicle state sensors, biometric sensors, or any other appropriate sensors. In some embodiments, video camera 214 is for capturing internal video data of the vehicle cab and the driver. Video camera 214 records video data which is then received and stored using storage 206. In some embodiments, vehicle event recorder data is transmitted using communication interface 218 to a vehicle data server. In some embodiments, communication interface 218 is used to transmit information indicating permissions for storage of internal video data on a vehicle data server. In some embodiments, video camera 214 includes an internal video data sensor for capturing internal video data of the vehicle cab and the driver. In some embodiments, processor 204 receives information from driver state sensors 202 using sensor interface 208. In some embodiments, sensor interface also interfaces with vehicle sensors 212 (e.g., any native vehicle sensors) using vehicle interface 210 (e.g., a vehicle information bus). In some embodiments, processor 204 determines whether a driver is in a dangerous state. In some embodiments, a determination of whether a driver is in a dangerous state is based at least in part on video data. In some embodiments, video data is received by processor 204 even when video capture setting is set to off. In some embodiments, processor 204 provides an indication to turn on video capture using video camera 214. In some embodiments, video camera 214 is off by default (e.g., some drivers are determined to be safe drivers by default and not require the video data sensor to be on, some driver organizations have negotiated for the camera to be off by default, etc.).

Figure 3:
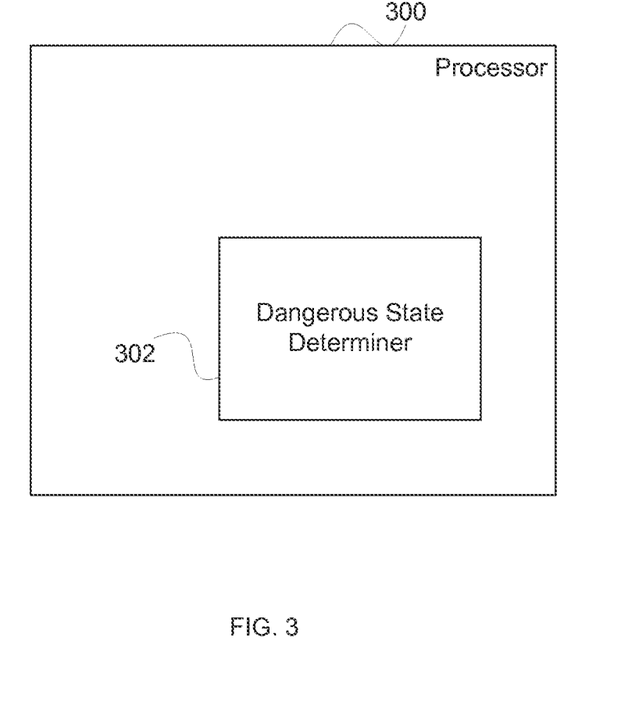
FIG. 3 is a block diagram illustrating an embodiment of a processor.

FIG. 3 is a block diagram illustrating an embodiment of a processor. In some embodiments, processor 300 comprises processor 204 of FIG. 2. In the example shown, processor 300 comprises a hardware or computer processor included in a vehicle event recorder. Processor 300 includes dangerous state determiner 302. Dangerous state determiner determines whether the vehicle is in a dangerous state based on sensor data received. In the event that a dangerous state is indicated, processor 300 causes the capture and storage of video data internal to the vehicle. In some embodiments, processor 300 causes the capture and storage of other relevant data (e.g., video data exterior to the vehicle or other sensor data about the vehicle or driver).

In some embodiments, a video camera receives a communication from processor 300 indicating whether the video camera should be turned on (e.g., outputting internal video data). In some embodiments, when internal video camera is providing video data, video data is stored in a storage memory (e.g., in a volatile memory, a non-volatile memory—for example, stored first in a volatile memory and then transferred to non-volatile memory of the storage memory). In some embodiments, processor 300 provides an indication whether video data stored in volatile memory is to be transferred to non-volatile memory. Processor 300 is able to indicate and cause video data stored in a non-volatile memory to be transferred to a server using a communication interface. In some embodiments, an indication is provided by processor 300 that video data should be stored with an indication that the video data is accessible to the client.

Figure 4:
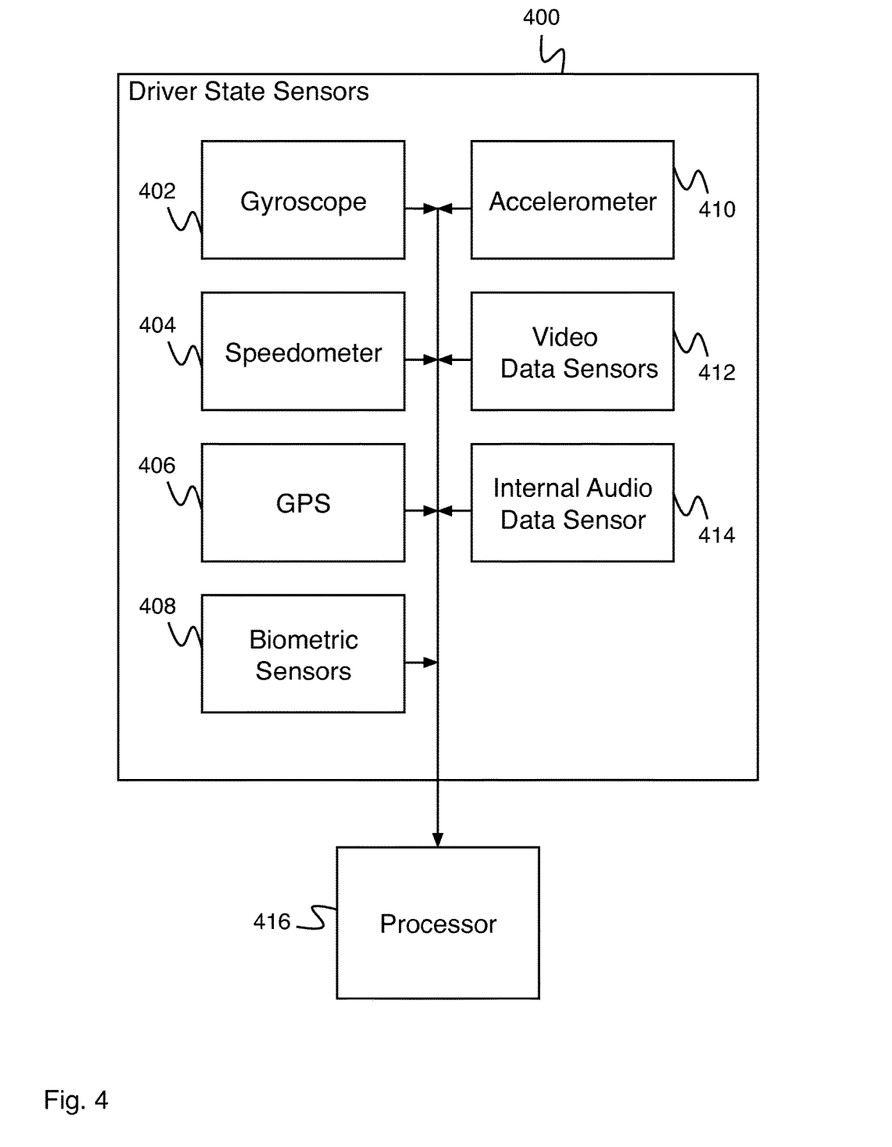
FIG. 4 is a block diagram illustrating an embodiment of driver state sensors.

FIG. 4 is a block diagram illustrating an embodiment of driver state sensors. In some embodiments, driver state sensors 400 comprise one or more sensors for determining a driver state. In some embodiments, sensors of driver state sensors 400 are additionally used for other purposes (e.g., determining a vehicle state, determining the state of other vehicles, determining a road state, determining a location, determining traffic state, determining an accident state, etc.). In the example shown, driver state sensors 400 comprise gyroscope 402, speedometer 404, global positioning system (e.g., GPS) 406, biometric sensors 408, accelerometer 410, video data sensor 412, and internal audio data sensor 414. In some embodiments, driver state sensors 400 additionally comprises an internal video data sensor and an external video sensor (e.g., enabling video to be taken inside and outside a vehicle). In some embodiments, processor 416 receives sensor data (e.g., using an interface (not shown in FIG. 4) from driver state sensors 400 for determining a driver state. In some embodiments, driver state sensors 400 are additionally used for determining whether a driver is in an accident state (e.g., if an accident has occurred).

Figure 5:
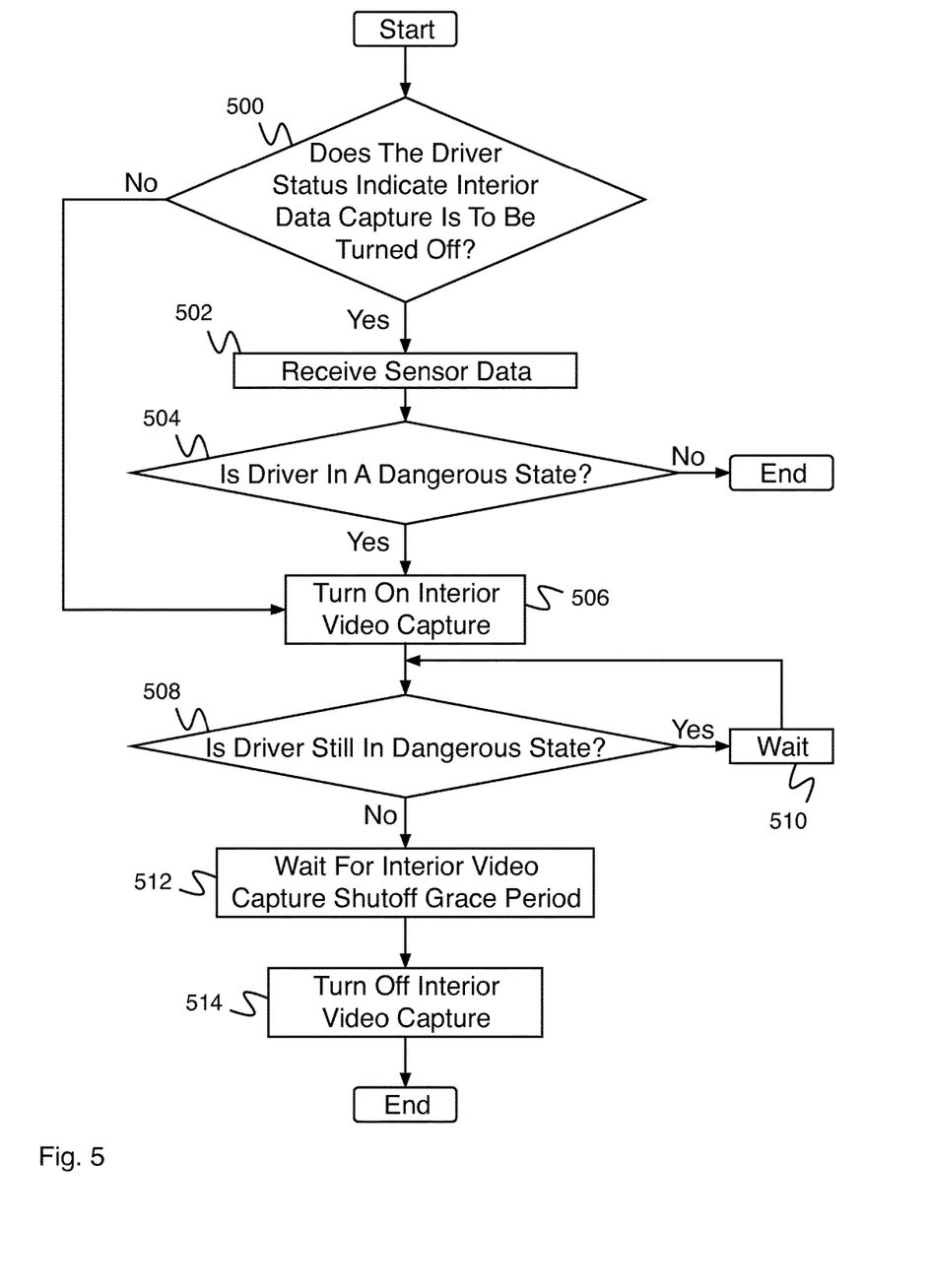
FIG. 5 is a flow diagram illustrating an embodiment of a process for capturing video.

FIG. 5 is a flow diagram illustrating an embodiment of a process for capturing video. In some embodiments, the process of FIG. 5 is executed by a vehicle event recorder (e.g., vehicle event recorder 102 of FIG. 1) for capturing video. In the example shown, in 500 it is determined whether the driver status indicates the interior data capture is to be turned off. In various embodiments, driver status indicates the interior data capture is to be turned off in the event the driver is indicated to be a good driver, in the event a driver organization has negotiated for the interior data capture to be turned off, in the event the system turns internal data capture off by default, or for any other appropriate reason. In the event the driver status does not indicate interior data capture is to be turned off, control passes to 506. In the event the driver status indicates interior data capture is to be turned off, control passes to 502. In 502, sensor data is received. In some embodiments, sensor data is received from driver state sensors (e.g., driver state sensors 202 of FIG. 2) except for video camera. In some embodiments, video data is processed but not stored in non-volatile memory. In 504, it is determined whether the driver is in a dangerous state. In some embodiments, it is determined whether the driver is in a dangerous state based at least in part on sensor data received in 502. In the event it is determined that the driver is not in a dangerous state, the process ends. In the event it is determined that the driver is in a dangerous state, control passes to 506. In 506, interior video capture is turned on. In various embodiments, turning on interior video capture comprises indicating that an internal video data sensor should be turned on, indicating that internal video data stored in a volatile memory should be transferred to a non-volatile memory, indicating that internal video data stored in a non-volatile memory should be communicated, indicating that internal video data that is communicated should be communicated including an indication that the internal video data should be stored with an indication that the video data is accessible to a client, or any other appropriate action.

In 508, it is determined whether the driver is still in the dangerous state (e.g., the dangerous state determined in 504). In the event the driver is still in the dangerous state, control passes to 510. In 510, the process waits. In various embodiments, the process waits 1 second, 30 seconds, 1 minute, 5 minutes, or any other appropriate amount of time. Control then passes to 508. In the event that it is determined in 508 that the driver is not still in the dangerous state, control passes to 512. In 512, the process waits for an interior video capture shutoff grace period. In some embodiments, the interior video capture shutoff grace period is based at least in part on the dangerous state (e.g., an intoxicated driving dangerous state has a long interior video capture shutoff grace period, a reckless speeding dangerous state has a short interior video capture shutoff grace period, etc.). In 514, interior video capture is turned off.

Figure 6:
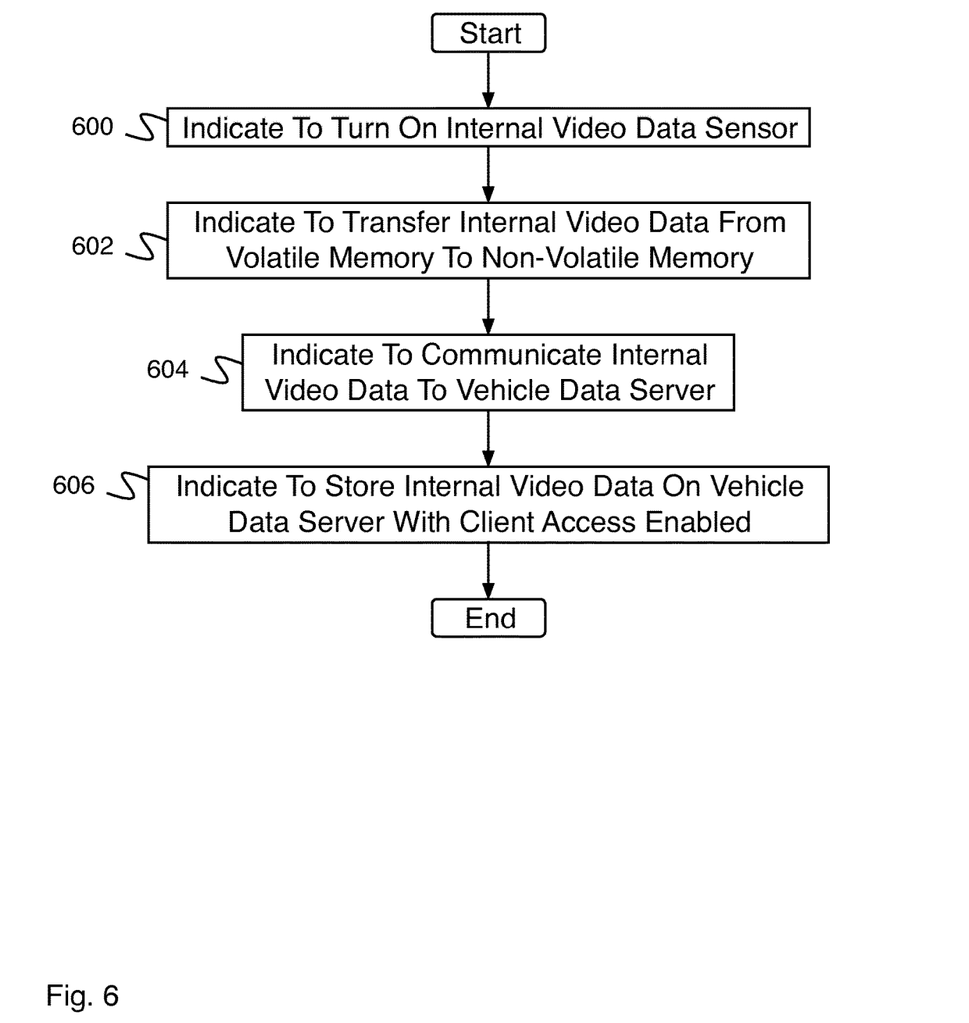
FIG. 6 is a flow diagram illustrating an embodiment of a process for turning on interior video capture.

FIG. 6 is a flow diagram illustrating an embodiment of a process for turning on interior video capture. In some embodiments, the process of FIG. 6 implements 506 of FIG. 5. In the example shown, in 600, it is indicated to turn on an internal video data sensor. In 602, it is indicated to transfer internal video data from volatile memory to non-volatile memory. In 604, it is indicated to communicate internal video data to a vehicle data server. In 606, it is indicated to store internal video data on the vehicle data server with client access enabled.

Figure 7:
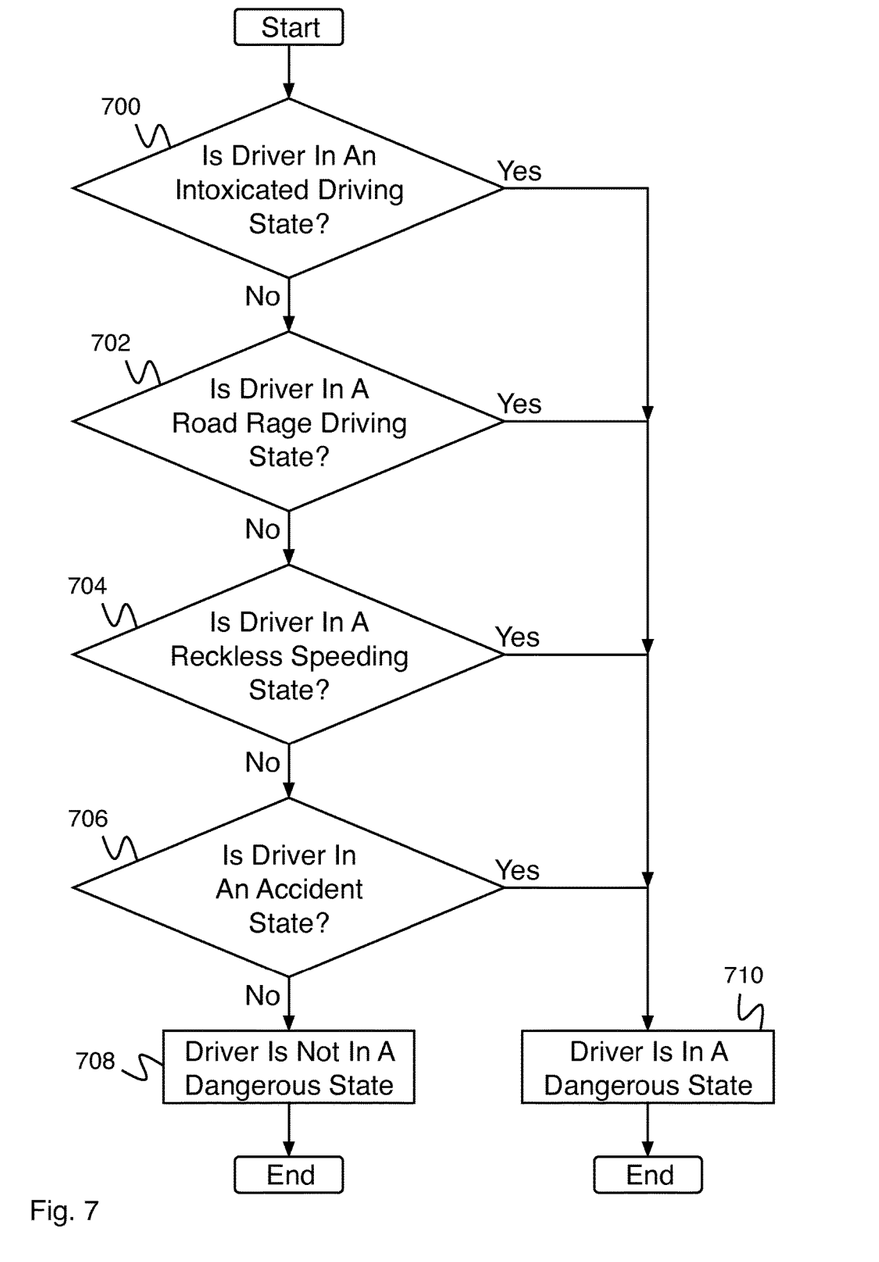
FIG. 7 is a flow diagram illustrating an embodiment of a process for determining whether a driver is in a dangerous state.

FIG. 7 is a flow diagram illustrating an embodiment of a process for determining whether a driver is in a dangerous state. In some embodiments, the process of FIG. 7 implements 504 of FIG. 5. In the example shown, in 700, it is determined whether the driver is in an intoxicated driving state. In some embodiments, an intoxicated driving state is identified based at least in part on driving patterns characterized as intoxicated. In some embodiments, driving patterns characterized as intoxicated are identified based at least in part on normative deviations for a driver. In some embodiments, driving patterns characterized as intoxicated are identified based at least in part on universal intoxicated driving patterns. In some embodiments, an intoxicated driving state is identified based at least in part on a biometric signal (e.g., a biometric signal determining the blood alcohol content of the driver—e.g., via sweat, breath, pupil dilation, etc.). In the event it is determined that the driver is in an intoxicated driving state, control passes to 710. In the event it is determined that the driver is not in an intoxicated driving state, control passes to 702. In 702, it is determined whether the driver is in a road rage driving state. In some embodiments, a road rage driving state is identified based at least in part on driving patterns characterized as road rage (e.g., swerving, erratic braking, erratic acceleration, etc.). In some embodiments, a road rage driving state is identified based at least in part on image recognition of road rage behaviors (e.g., image recognition of the driver acting violently, making rude gestures, etc.). In some embodiments, a road rage driving state is identified based at least in part on speech recognition of road rage behaviors (e.g., speech recognition of the driver shouting insults, swearing, etc.). In some embodiments, a road rage driving state is identified based at least in part on normative deviations for a driver. In some embodiments, a road rage driving state is identified based at least in part on universal road rage patterns. In the event it is determined that the driver is in a road rage driving state, control passes to 710. In the event it is determined that the driver is not in a road rage driving state, control passes to 704.

In 704, it is determined whether the driver is in a reckless speeding driving state. In some embodiments, a reckless speeding dangerous state is identified based at least in part on a posted speed (e.g., more than 20 miles per hour over the posted speed limit). In some embodiments, a reckless speeding dangerous state is identified based at least in part on a reckless speeding threshold (e.g., more than 90 miles per hour on any road or a threshold based on road type such as more than 50 miles per hour on a residential road). In some embodiments, a reckless speeding dangerous state is identified based at least in part on a location (e.g., for determining the speed limit associated with the location). In the event it is determined that the driver is in a reckless speeding driving state, control passes to 710. In the event it is determined that the driver is not in a reckless speeding driving state, control passes to 706. In 706, it is determined whether the driver is in an accident state. In some embodiments, it is determined whether the driver is in an accident state based at least in part on sensor data (e.g., accelerometer data, gyroscope data, microphone/sound analysis—sound of braking glass or crumpling metal, etc.) indicating an accident is occurring. In the event it is determined that the driver is in an accident state, control passes to 710. In the event it is determined that the driver is not in an accident state, control passes to 708. In some embodiments, other dangerous driver states are determined. In 708, it is determined that the driver is not in a dangerous state, and the process ends. In 710, it is determined that the driver is in a dangerous state.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for capturing video, comprising:
    an input interface configured to receive sensor data, wherein the sensor data includes vehicle dynamics data and driver behavior data, and the driver behavior data includes at least one of gestures and vocalization; and
    a processor configured to:
        determine a pattern of driving based on the received sensor data;
        determine that the driver is to be recorded in response to a driving characteristic, wherein the driving characteristic is determined based on: (i) the driver behavior data meeting a threshold and (ii) at least one of the pattern of driving matching a baseline driving pattern and the pattern of driving deviating from a driver-specific pattern;
        responsive to a determination that the driver is to be recorded, provide an indication to turn on interior video capture; and
        transmit the interior video capture to a vehicle data server, the interior video capture being usable by the vehicle data server to review at least one of driver performance and vehicle performance.

2. The system of claim 1, wherein the determination of whether to record the driver includes determining whether the driver is in an intoxicated driving state, the intoxicated driving state being indicated by at least one of: the pattern of driving meeting a threshold and measured biometrics of the driver meeting an intoxication threshold.

3. The system of claim 2, wherein the intoxicated driving state is identified based at least in part on the pattern of driving being characterized as intoxicated.

4. The system of claim 2, wherein the intoxicated driving state is identified based at least in part on a biometric signal of the driver exceeding a blood alcohol level.

5. The system of claim 3, wherein the driving patterns characterized as intoxicated are identified based at least in part on normative deviations for the driver from baseline intoxicated driving patterns.

6. The system of claim 3, wherein the driving patterns characterized as intoxicated are identified based at least in part on a level of similarity between the pattern of driving and universal intoxicated driving patterns meeting a threshold.

7. The system of claim 1, wherein the determination of whether to record the driver includes determining whether the driver is in a road rage driving state, the road rage driving state being indicated by at least one of: the pattern of driving meeting a threshold and the driver behavior data matching a baseline road rage pattern of behavior.

8. The system of claim 7, wherein the road rage driving state is identified based at least in part on the pattern of driving being characterized as road rage, the pattern of driving including at least one of: spacing between vehicles and vehicle acceleration.

9. The system of claim 7, wherein the road rage driving state is identified based at least in part on image recognition of gestures indicating road rage behaviors, the gestures including movement of limbs.

10. The system of claim 7, wherein the road rage driving state is identified based at least in part on speech recognition of road rage behaviors.

11. The system of claim 7, wherein the road rage driving state is identified based at least in part on normative deviations for driver from baseline road rage driving patterns.

12. The system of claim 1, wherein the determination of whether to record the driver includes determining whether the driver is in a reckless speeding dangerous state, the reckless speeding dangerous state being indicated by a speed of the vehicle exceeding a threshold speed.

13. The system of claim 12, wherein the reckless speeding dangerous state is identified based at least in part on a posted speed.

14. The system of claim 12, wherein the reckless speeding dangerous state is identified based at least in part on a location.

15. The system of claim 1, wherein the interior video capture is turned off when it is determined that the driver is no longer to be recorded.

16. The system of claim 1, wherein the interior video capture is turned off when it is determined that the driver is no longer to be recorded for greater than a predetermined time period.

17. The system of claim 1, wherein the determination of whether to record the driver includes determining whether the driver is in a road rage driving state, wherein the road rage driving state is identified based at least in part on image recognition of road rage behaviors, speech recognition of road rage behaviors, or any combination thereof.

18. The system of claim 1, wherein the indication to turn on interior video capture includes an indication that an internal video data sensor should be turned on, an indication that internal video data stored in a volatile memory should be transferred to a non-volatile memory, an indication that internal video data stored in a non-volatile memory should be communicated, an indication that client access to stored internal video data should be enabled, or any combination thereof.

19. The system of claim 1, wherein the determination of whether to record the driver includes determining whether the driver is in an accident state, the accident state being indicated by at least one of: the pattern of driving and the driver behavior data meeting a threshold indicating that an accident is occurring.

20. A method for capturing video, comprising:
- receiving sensor data, wherein the sensor data includes vehicle dynamics data and driver behavior data, and the driver behavior data includes at least one of gestures and vocalization;
- determining, using a processor, a pattern of driving based on the received sensor data;
- determining, using the processor, that the driver is to be recorded in response to a driving characteristic, wherein the driving characteristic is determined based on: (i) the driver behavior data meeting a threshold and (ii) at least one of the pattern of driving matching a baseline driving pattern and the pattern of driving deviating from a driver-specific pattern;
- responsive to a determination that the driver is to be recorded, providing an indication to turn on interior video capture; and
- transmitting the interior video capture to a vehicle data server, the interior video capture being usable by the vehicle data server to review at least one of driver performance and vehicle performance.

21. A computer program product for capturing video, the computer program product being embodied in a non-transitory computer readable storage medium and comprising computer instructions for:
- receiving sensor data, wherein the sensor data includes vehicle dynamics data and driver behavior data, and the driver behavior data includes at least one of gestures and vocalization;
- determining a pattern of driving based on the received sensor data;
- determining that the driver is to be recorded in response to a driving characteristic, wherein the driving characteristic is determined based on: (i) the driver behavior data meeting a threshold and (ii) at least one of the pattern of driving matching a baseline driving pattern and the pattern of driving deviating from a driver-specific pattern;
- responsive to the determination that the driver is to be recorded, providing an indication to turn on interior video capture; and
- transmitting the interior video capture to a vehicle data server, the interior video capture being usable by the vehicle data server to review at least one of driver performance and vehicle performance.

\* \* \* \* \*